United States Patent
Hess

[19]

[11] Patent Number: 5,835,696
[45] Date of Patent: Nov. 10, 1998

[54] DATA ROUTER BACKUP FEATURE

[75] Inventor: Gary C. Hess, Lincroft, N.J.

[73] Assignee: Lucent Technologies Inc., Murray Hill, N.J.

[21] Appl. No.: 561,675

[22] Filed: Nov. 22, 1995

[51] Int. Cl.[6] .................................................. G06F 11/34
[52] U.S. Cl. ...................................... 395/182.08; 370/220
[58] Field of Search ........................... 395/182.02, 183.19, 395/180, 181, 182.01, 182.08, 182.09, 182.11; 370/16, 16.1, 216–228; 340/825.01

[56] References Cited

U.S. PATENT DOCUMENTS

| | | |
|---|---|---|
| 4,958,273 | 9/1990 | ANderson et al. |
| 4,984,240 | 1/1991 | Keren-Zvi et al. ................ 395/182.02 |
| 5,473,599 | 12/1995 | Li et al. ............................. 395/182.11 |
| 5,610,905 | 3/1997 | Nurthy et al. ........................... 370/401 |
| 5,621,884 | 4/1997 | Beshears et al. ................... 395/182.08 |
| 5,649,091 | 7/1997 | Ould-Ali et al. ................... 395/182.09 |

*Primary Examiner*—Albert DeCady
*Attorney, Agent, or Firm*—F. B. Luludis

[57] ABSTRACT

A back-up facility for data routers is enhanced by providing a mutual back-up feature which allows each of the routers to be active at the same time while also providing a standby monitoring function for the other router(s).

9 Claims, 3 Drawing Sheets

```
router_10-1#write term

Current configuration:
!
version 10.0
!
hostname router_0-1
!
boot system flash 7k10040z
boot system rom
enable password router_0-1
!
no ip domain-lookup
!
```

PORT 11-1 {
```
interface Ethernet 0/0
ip address 173.8.1.3 255.255.255.192
no ip redirects
no mop enabled
standby group 100
standby priority 100
standby preempt
standby ip
```
}
```
!
```

PORT 11-2 {
```
interface Ethernet 0/1
ip address 173.8.2.3 255.255.255.192
no ip redirects
no mop enabled
standby group 50
standby priority 50
standby preempt
standby ip 173.8.2.4
```
}
```
!
interface Serial1/0
   :
   :
!
router rip
network 173.8.0.0
redistribute static
!
   :
   :
end
```

FIG. 4

```
router_10-2#write term

Current configuration:
!
version 10.0
!
hostname router_0-2
!
boot system flash 7k10040z
boot system rom
enable password router_0-2
!
no ip domain-lookup
!
```

PORT 12-1
```
interface Ethernet 0/0
ip address 173.8.1.4 255.255.255.192
no ip redirects
no mop enabled
standby group 100
standby priority 50
standby preempt
standby ip 173.8.1.3
```
!

PORT 12-2
```
interface Ethernet 0/1
ip address 173.8.2.4 255.255.255.192
no ip redirects
no mop enabled
standby group 50
standby priority 100
standby preempt
standby ip
```
!
interface Serial1/0
⋮

!
router rip
network 173.8.0.0
redistribute static
!
⋮ end

DATA ROUTER BACKUP FEATURE

FIELD OF THE INVENTION

The invention relates to data routers and the like and more particularly relates to a back-up scheme between so-called active and standby data routers.

BACKGROUND OF THE INVENTION

A local data network may include a host processor serving as a database of information that may be accessed by remote users, e.g., workstations, via a wide area network. The local data network may also include a data router to interface the host with the wide area network. For reliability purposes, the routing function may be implemented by a pair of data routers, an active router and a standby router. As is well-known, the standby router is made active whenever the active router is inoperable.

It is typically the case that the various equipments forming such a network are supplied by different vendors. For example, one vendor (e.g., Cisco Systems, Inc.) may supply the routers, a second vendor (e.g., CentreCOM Inc.) may supply the local area network components, and a third vendor (e.g., Hewlett-Packard) may supply the host processor and the remote workstations. In such an instance, the host processor is usually not programmed to monitor the "health" of the routers. However, a user may customize the host processor to do so by loading appropriate software in the host processor. The host would then monitor the network and invoke a maintenance function whenever the host determines that a router is not operating properly. However, providing such software could turn out to be an expensive undertaking.

One maintenance scheme for monitoring the "health" of routers provides one or more standby routers which may be activated whenever its corresponding paired router becomes faulty or inoperable, as mentioned above and as shown in FIG. 1. This is done by arranging a port in a standby router to monitor the operability of its corresponding port in the active router. If the port in the standby router detects that its corresponding port in the active router is inoperable, it then activates itself to assume the responsibilities of the inoperable port, thereby making the standby router the active router.

It is apparent that providing a standby router for the sole purpose of monitoring the "health" of an active router is indeed an expensive undertaking.

SUMMARY OF THE INVENTION

I have recognized that a better approach is to make each router of a pair of routers active and include a secondary port in each such router to operate as a standby port. The standby port in a first active router is configured to monitor the operability of the active port of a second router, and vice-versa. If the standby port of the first router detects a failure in the active port of the second router, then the standby port assumes the identity of the faulty active port and accepts data traffic addressed to that faulty port. The first router, with the now activated standby port, then, in accord with an aspect of the invention, routes the data traffic to the standby port of the second router through the first router's active port, so that the second router may route the data traffic through its wide area network ports toward the intended destinations.

These and other aspects of the invention will be appreciated from the following detailed discussion and ensuing claims.

BRIEF DESCRIPTION OF THE DRAWINGS

In the drawing:

FIGS. 3 and 4 are illustrative examples of so-called configuration data that is respectively loaded into the routers of FIG. 2 to implement the principles of the invention therein.

DETAILED DESCRIPTION

Although the following discusses an illustrative example of the invention in the context of particular data routers, it is clear that the invention is applicable to other equipments/hardware configured into an active and standby pair, as is typically done with data processors and computer systems.

Figure 1:
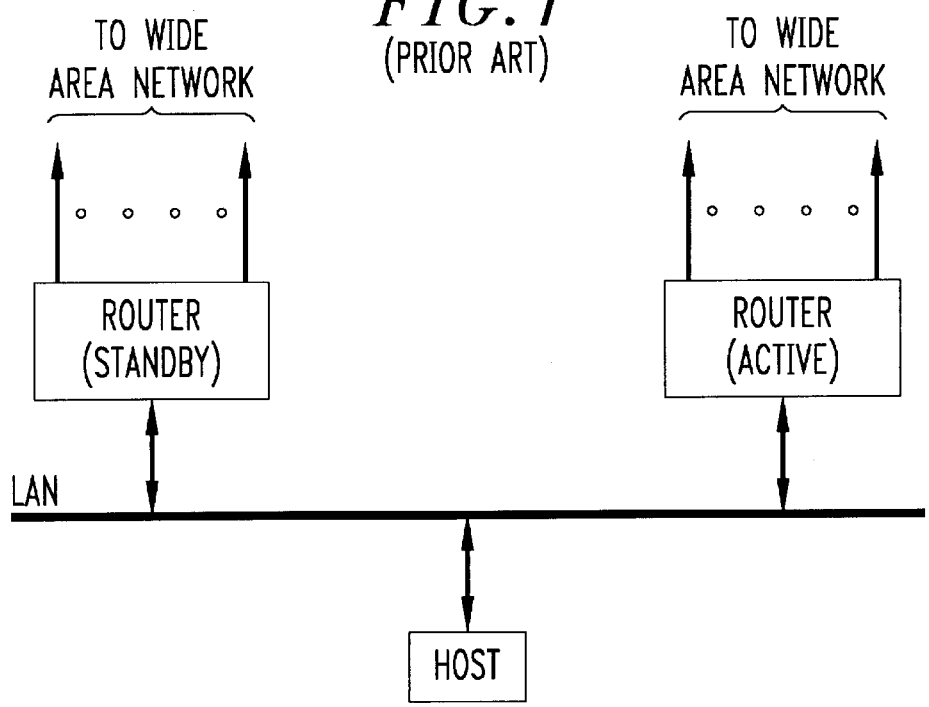
FIG. 1 illustrates in block diagram form a pair of routers interconnected to one another to provide a conventional backup scheme.
Figure 2:
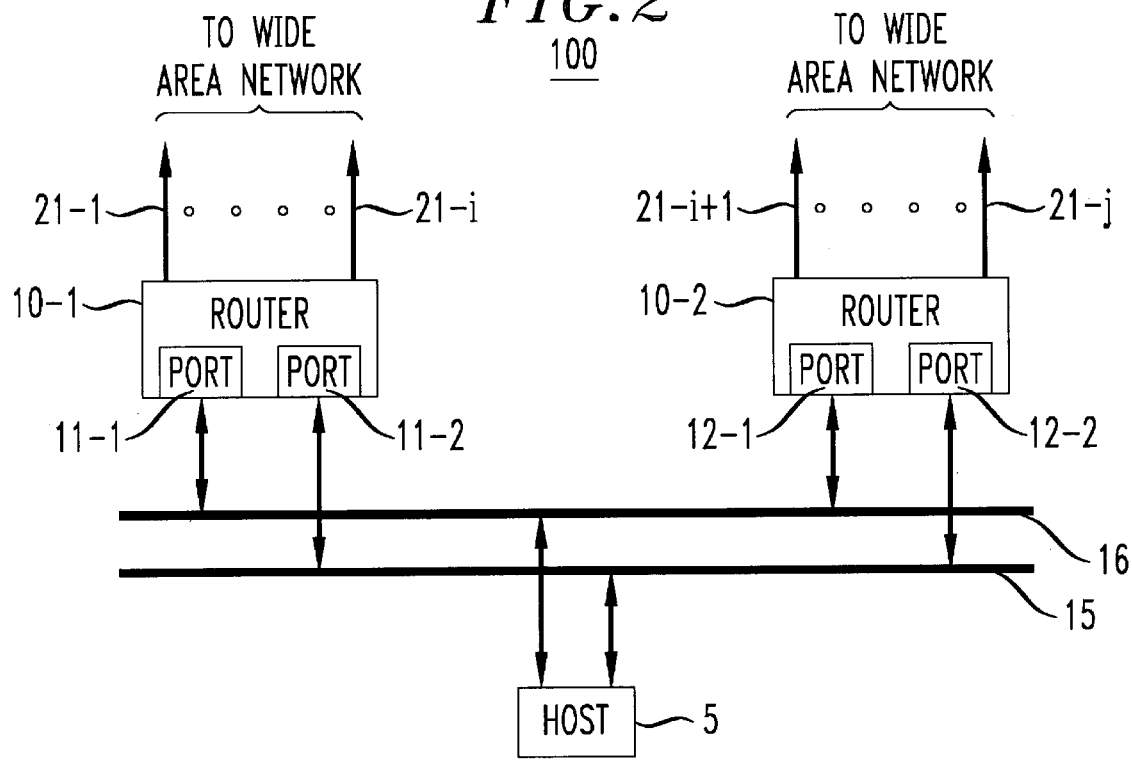
FIG. 2 illustrates in block diagram form a pair of routers interconnected in accordance with the principles of the invention.

Turning then to FIG. 2, local data system 100 includes host 5, dual local area networks (LANs) 15 and 16 as well as a pair of dual-ported data routers 10-1 and 10-2 respectively serving links 21-1 to 21-i and 21-i+1 to 21-j extending to respective destinations via the wide area network. Host 5, which may be, for example, a conventional database server for a client/server application, operates to transmit and receive messages to and from the wide area network via active ports of routers 10-1 and 10-2, respectively. LANs 15 and 16 may each be the well-known Ethernet Local Area Network (LAN) and routers 10-1 and 10-2 each may be, for example, the model 7000 dual ported router available from Cisco Systems, Inc. The model 7000 router provides a so-called Hot-Standby-Router (HSR) protocol discussed in Product Bulletin No. 247 available from Cisco Systems, Inc., which is hereby incorporated by reference. Briefly, in accord with the protocol, the routers are configured as a hot standby group with one router in the group designated as the active (lead) router. The other router(s) in the group monitors the operability of the active router. If the active router fails, then the other router (standby) assumes the so-called IP and MAC addresses of the group, thereby becoming the active router.

I have recognized that a more advantageous scheme configures each router of a group, in accord with an aspect of the invention, as an active router such that each router in the group includes an active port and hot-standby port such that the active port of one router of the group and standby port of another router in the same group are connected to the same LAN. In this way the standby port in one router may monitor that active port in the other router, as shown in the FIG. 2. Specifically, assume that ports 11-1 and 12-2 are active ports. Then ports 12-1 and 11-2 would be the standby ports by virtue of the configuration data loaded into routers 10-1 and 10-2 (discussed below) and as a result of being respectively connected to LANs 16 and 15.

A standby port monitors its associated active port in accord with the above-mentioned HSR protocol. For example, the standby port periodically sends a so-called "heart beat" message to the active port and expects to receive an acknowledgment message in return. That is, the active port transmits a conventional acknowledgment message in response to receipt of the "heart beat" message from the standby port. If the standby port receives the acknowledgment, then it concludes that the active port is operating properly. However, if an acknowledgment is not received within a predetermined period of time, then the standby retransmits the "heart beat" message. If an acknowledgment is still not received, then the standby port assumes the active state by assuming the MAC and IP addresses assigned to the active port.

For example, assume that port 11-1 of router 10-1 develops a fault and is no longer operating properly. In that case, then, router 10-1 would be unable to receive messages that host 5 transmits thereto via LAN 16 and port 11-1. However, port 12-1 of router 10-2 would detect the port 11-1 failure in the manner described above and then assume the identity of the failed port, i.e., become the active port for router 10-1 even though it is associated with another router, router 10-2. Armed with the identity of port 11-1, port 12-1 then, in accord with an aspect of the invention, becomes the active port of the group and operates to "capture" messages from LAN 16 that host 5 transmits to destinations via router 10-1 and the wide area network links served by router 101. Thus, port 12-1 monitors LAN 16 for a message bearing the address of router 10-1 active port, captures such a message from LAN 16 and presents it to the router 10-2 message processor. The latter processor identifies the destination address in the message and routes the message to the destination in accord with routing data contained in its associated routing table that it constructed as a result of running the well-known RIP protocol. That is, routers 10-1 and 10-2, populate their respective routing tables using routing data that they acquire as a result of periodically invoking the RIP protocol (or a similar protocol), as is done conventionally. The RIP protocol allows a router to determine the configuration of its associated wide area network, in particular, the proper routing for messages that are to be sent to identified destinations via the wide area network. The network elements, e.g., routers, thus periodically exchange configuration data with one another and use such data to update their respective routing tables to reflect changes in the routing to a particular destination. In accordance with such routing data, router 10-2 is able to properly route a message toward its destination via a wide area network link. That is, the routing data would instruct router 10-2 to route the message via router 10-1. Router 10-2 thus inserts a local routing address (MAC address of port 11-2) in the message and then outputs the message to LAN 15 via its associated port 12-2. Port 11-2 of router 10-1, in turn, captures the message from LAN 15 and presents the message to the router 10-1 message processor. The latter processor then routes the message, in accord with the routing data contained in its associated routing table, to the destination identified in the message via the appropriate one of the paths/links 21-1 through 21-i. (It is noted that messages received via the wide area network and addressed to host 5 would traverse an opposite path via port 12-2.)

The foregoing is readily achieved by simply specifying the configuration data for port 11-1 of router 10-1 and port 12-1 of router 10-2 so those ports, in accord with an aspect of the invention, are in the same group and share the same IP address even though they are in different routers. The configuration data similarly specifies, in accord with an aspect of the invention, that port 11-2 of router 10-1 and port 12-2 of router 10-2 form another group and share the same IP address. Advantageously, then, the instant invention is not software based and, therefore, may be readily implemented in a router by loading such configuration data in routers 10-1 and 10-2, respectively.

An illustrative example of the configuration data that may be specified for ports 11-1, 11-2 12-1 and 12-2 is shown in FIGS. 3 and 4, respectively. FIGS. 3 and 4 also illustrate other configuration data not pertinent to the claimed invention but is, nevertheless, shown for completeness. It is noted that the data/parameters shown in FIG. 3 (4) is loaded into router 10-1 (10-2) to specify the configuration parameters for that router.

Referring first to the configuration data/parameters for port 10-1, the first six lines specify conventional data, i.e., (a) the version of the configuration data, (b) the host name for the router (i.e., router 10-1), (c) instructions for re-booting, i.e., the file name of the boot file (7k10040z), (d) assignment of the a system password and (e) a specification for no ip domain lookup. The input next specifies the configuration data/parameters for port 11-1 as indicated. Specifically, the data indicates that port 11-1 interfaces with Ethernet port 0/0 (designated port 11-1, which is connected to LAN 16 as shown in FIG. 2) and is associated with an IP address of 173.8.1.3. The data following the IP address, 255.255.255.192, is a conventional "net mask" for that address. A net mask is used to mask out the network and node addresses from the full IP address. The configuration data then disables "ip directs" and deactivates "mop enabled" functions. The configuration data next indicates that port 11-1 is associated with group 100 and has a standby priority of 100. Similarly, the configuration data for port 12-1 indicates that port 12-1 is also associated with group 100 and has a standby priority value of 50. The value associated with the "standby priority" parameter indicates whether the port acts as the active or standby port. That is, the port having the highest value for the "standby priority" parameter acts as the active port for the group, whereas the port having the lowest value acts as the standby port. Thus, for the instant case a standby-priority value of 100 indicates that port 11-1 acts as the active (primary) port for group 100 and port 12-1 acts as the standby port for that group. Continuing, the configuration data for port 11-1 next specifies a "standby preempt" command meaning that, in accord with the aforementioned HSR protocol, port 11-1 assumes control for interfacing with host 5 (FIG. 2) at the "ip" level if a problem occurs. The "standby ip" parameter for port 11-1 indicates that port 11-1 assumes its specified address of 173.8.1.3. It is seen, however, that a standby ip address of 173.8.2.4 (FIG. 3) is specified for port 11-2—meaning that port 11-2 assumes the ip address assigned to port 12-2 as shown by the configuration data for port 12-2 in FIG. 4. That is, since ports 11-2 and 12-2 form group 50 and have respective priority standby values of 50 and 100, port 12-2 is the active port and port 11-2 is the standby port for group 50 for the reasons mentioned above. Accordingly, if port 12-2 becomes inoperative, then port 11-2 assumes the ip address assigned to port 12-2, thereby becoming the active port. Port 12-1 acts similarly with respect to port 11-1 as indicated by the configuration data specified for port 12-1 (FIG. 4).

The input then provides a conventional specification of data/parameters for the output ports connecting the associated router to the wide area network, in which the specification starts with the command "interface serial 1/0" and ends with a specification invoking the RIP protocol, as shown in FIG. 3 and 4 for routers 10-1 and 10-2, respectively. The input for each router then specifies a basic network address for the RIP protocol and "redistribute static". The latter parameter means that the router is to redistribute static routes by causing the routing process to advertise static routes, which define route maps. Other conventional data not pertinent to the claimed invention is then specified for routers 10-1 and 10-2.

The foregoing is merely illustrative of the principles of the invention. Those skilled in the art will be able to devise numerous arrangements, which, although not explicitly shown or described herein, nevertheless embody those principles that are within the spirit and scope of the invention. For example, based on the foregoing discussion it is clear that the principles of the claimed invention may be applied to more than two routers, e.g., three routers.

I claim:

1. A method of providing a backup feature for data processors each having a plurality of input ports for receiving messages from a host processor via respective communications paths, said method comprising the steps of arranging a first input port of a first data processor and a second input port of a second data processor into a group and respectively designating said first and second input ports as active and standby ports for said group, responsive to said first port becoming inoperative, causing said second port to assume an identity priorly specified for said first port so that said second port may receive a message that the host transmits to said first port via the respective one of said communications paths for presentation to its associated second data processor, and arranging said second data processor so that it routes said message to a second input port of said first data processor by inserting a local address associated with said second input port of said first data processor in said message and then outputting said message to said one of said communications paths for receipt by the latter input port, thereby causing said message to be delivered to said first processor as intended.

2. The method of claim 1 further comprising the steps of arranging said second input port of said first data processor and a first input port of said second data processor into another group and respectively designating those two ports as standby and active for the other group, responsive to said first input port of said second data processor becoming inoperative, causing said second port of said first data processor to assume an identity priorly specified for said first port of said second data processor so that said second port of said first data processor may receive a message that the host transmits to said first port of said second data processor via another one of said communications paths for presentation to its associated first data processor, and arranging said first data processor so that it routes said message to the second input port of said second data processor by inserting a local address associated with said second input port of said second data processor and then outputting said message to said other one of said communications paths for receipt by the latter input port, thereby causing said message to be delivered to said second data processor as intended.

3. The method of claim 2 wherein said one of said communications paths and said other one of said communications paths are the same communications path.

4. A method of providing a backup feature for data processors each having a plurality of input ports for receiving messages from a host processor via respective communications paths, said method comprising the steps of connecting first and second input ports of a first one of said data processors to first and second busses, respectively, said first and second busses connecting to respect data ports of said host, connecting first and second input ports of a second one of said data processors to said second and first busses, respectively, causing the first and second input ports of said first and second data processors, respectively, to be active ports and respectively causing the second and first input ports of said first and second data processors to be standby ports such that if the first port of said first data processor becomes inoperable then the first port of said second data processor assumes the active state for said first data processor and such that, alternatively, if the second port of said second data processor becomes inoperable then the second port of said first data processor assumes the active state for said second first data processor.

5. A method of interconnecting data processors each having a plurality of bus interface ports, said method comprising the steps of connecting a first bus interface port of a first one of said data processors to a bus and connecting a first bus interface port of a second one of said data processor to said bus, and causing the first bus interface port of said first processor to be an active port so that it removes messages destined for said first data processor from said bus and causing the first bus interface port of said second data processor to be a standby port such that it becomes the active port for said first data processor if the first bus interface port of said first processor becomes inoperable.

6. The method of claim 5 further comprising the steps of connecting a second bus interface port of said first one of said data processors to another bus and connecting a second bus interface port of said second one of said data processor to said other bus, and causing the second bus interface port of said second data processor to be an active port so that it removes messages destined for said second data processor from said other bus and causing the second first bus interface port of said first data processor to be a standby port such that it becomes the active port for said second data processor if the second bus interface port of said second data processor becomes inoperable.

7. An architecture for interconnecting data processors each having a plurality of bus interface ports comprising connecting a first bus interface port of a first one of said data processors to a bus extending to a host processor and connecting a first bus interface port of a second one of said data processors to said bus, and arranging the first bus interface port of said first data processor so that it operates as an active port and removes messages destined for said first data processor from said bus and arranging the first bus interface port of said second data processor so that it operates as a standby port such that it becomes the active port for said first data processor if the first bus interface port of said first processor becomes inoperable.

8. The architecture of claim 7 further comprising connecting a second bus interface port of said first data processors to another bus also extending to said host processor and connecting a second bus interface port of said second data processor to said other bus, and arranging the second bus interface port of said second data processor so that it operates as active port so that it removes messages destined for said first data processor from said other bus and arranging the second bus interface port of said first data processor so that it operates as a standby port such that it becomes the active port for said second data processor if the second bus interface port of said second data processor becomes inoperable.

9. A apparatus for backing up data processors each having a plurality of input ports for receiving messages from a host processor via respective communications paths comprising connecting a first input port of a first data processor and a second input port of a second data processor into a group and respectively designating said first and second ports as active and standby ports for said group, means, responsive to said first port becoming inoperative, for causing said second port to assume an identity priorly specified for said first port so that said second port may receive a message that the host transmits to said first port via the respective one of said communications paths for presentation to its associated second data processor, and means for causing said second data processor to route said message to a second input port of said first data processor so as to cause said message to be delivered to said first processor as intended by said host.

* * * * *